United States Patent Office 3,453,073
Patented July 1, 1969

3,453,073
HYDROGEN CHLORIDE RECOVERY PROCESS
Victor A. Sims, Bayonne, N.J., assignor to Air Reduction Company, Incorporated, New York, N.Y., a corporation of New York
No Drawing. Filed Mar. 31, 1967, Ser. No. 627,326
Int. Cl. C01b 7/08
U.S. Cl. 23—154                                9 Claims

ABSTRACT OF THE DISCLOSURE

Halogen values in chlorinated hydrocarbons are recovered by passing a gaseous mixture of the chlorinated hydrocarbons, water, and oxygen through a bed of a catalyst to form hydrogen chloride which is then recovered.

---

This invention relates to novel recovery processes, and more particularly, it relates to processes for recovering useful halogen values from halogenated hydrocarbons.

In many commercially-practiced industrial halogenation processes, a desired product or desired products are obtained in association with quantities of unwanted halogenated hydrocarbon by-products. Many of these products are too highly halogenated, too low in quantity, or too impure in form to be applied successfully to any other use, and they represent a waste of both the halogen and organic contents thereof. While it is sometimes suggested that the unwanted halogenated hydrocarbons can be further processed to provide useful materials, frequently the capital investment required for such an operation far exceeds the economic justification for such further processing.

The disposal problem is further aggravated by the fact that ordinarily the halogenated hydrocarbons cannot merely be released to the air or flushed away with water without causing serious water or atmospheric pollution. The pollution problems arise because of the toxicity of some of the halogenated hydrocarbons, their immiscibility with water, and in many cases their chemical stability which prevents them from breaking down readily into harmless waste products.

Exemplary of processes which produce amounts of unwanted halogenated hydrocarbons are the catalytic production of unsaturated hydrocarbons and saturated and unsaturated halogenated hydrocarbons by the chlorination of acetylene, ethylene, or ethane with chlorine and/or hydrogen chloride in the gaseous phase. While a typical product stream from these reactions contains desirable products such as vinyl chloride, mono- and dichlorethanes, and saturated and unsaturated hydrocarbons such as ethane and ethylene, quantities of chlorinated methanes and tri- and tetrachlorinated ethanes and ethylenes are also produced. As stated above, these materials are frequently present in too small a quantity to justify their recovery, but they constitute a potential source of air or water pollution, and they waste valuable halogen.

This invention provides a method for recovering the halogen values from higher chlorinated hydrocarbons and chlorinated methanes.

Briefly, this invention provides a process for recovering the halogen values in halogenated hydrocarbons which comprises passing chlorinated hydrocarbons, water, and oxygen over suitable acid-type catalysts at elevated temperatures to form hydrogen chloride. The hydrogen chloride so formed is then recovered. This process not only converts the halogen to the hydrogen halide which can then be recycled to the process or otherwise be put to good use, but it also converts the chlorinated hydrocarbons to oxides of carbon and to water which can then be safely released to the atmosphere after the hydrogen halide is removed. It has been found that there is no coking or deposition of carbonaceous material in the process of this invention as occurs with other processes for destroying unwanted halogenated hydrocarbons, which often use flame.

This invention is broadly applicable to the treatment of chlorinaated hydrocarbons, and is especially adapted to the treatment of halogenated lower alkyl hydrocarbons. Lower alkyl hydrocarbons as used herein means hydrocarbons containing from about 1 to about 4 carbon atoms in the molecule. It is especially preferred to utilize hydrocarbons containing 1 or 2 carbon atoms in the molecule since these are the materials most commonly found in waste gas streams. Materials such as $CHCl=CCl_2$ and $Cl_2C=CCl_2$ can be satisfactorily treated according to the process of this invention, and optimum conversion of the chlorinated hydrocarbon to hydrogen chloride is obtained with halogenated hydrocarbons such as $CH_2Cl_2$, $CHCl_3$, $CCl_4$, $CHCl_2CH_2Cl$, and $CHCl_2CHCl_2$.

The mixture of halogenated hydrocarbons to be treated can contain other materials, such as saturated and unsaturated hydrocarbons, hydrogen chloride, chlorine, and the like. In most instances it is desirable, however, that the amounts of these contaminants be held to a minimum since the system will have to be oversized in order to handle substantial quantities of materials in addition to the chlorinated hydrocarbons.

The quantity of water fed to the system should be at least stoichiometric. Greater quantities of water can be used, and quantities of water in excess of the stoichiometric amount moderate and serve as a diluent for the reaction. The stoichiometric quantity of water is that amount wherein one molar proportion is present for each mole of the halogen (on a monatomic basis). In practice this amount can be determined either from an analysis of the chlorinated hydrocarbons fed to the reaction, or it can be determined empirically by adding sufficient water to bring the amount of hydrocarbon in the effluent stream down to a minimum. The foregoing reference to a stoichiometric quantity of water refers to the H in the $H_2O$ fed since it is the H in the $H_2O$ and the available H in the hydrocarbons which supply the H in the HCl.

The oxygen used in the process of this invention can be supplied as the pure material or in admixture with an inert diluent. If it is supplied in the pure form, an inert diluent can be added with it or the water can be increased in an amount so as additionally to act as the inert diluent. One of the preferred sources of oxygen for use in this process is air. Generally, sufficient oxygen is added so that it comprises from about 1 to about 10% by volume of the gaseous mixture. With smaller quantities of oxygen the benefits of having it present are rapidly lost, and larger quantities of oxygen in the gaseous mixture may create handling problems particularly when air is used. The oxygen supplies heat by reason of its reaction and may function as a catalyst or promoter.

A wide variety of catalysts can be used in the practice of this invention. Many of the known oxidation catalysts give excellent results herein, particularly the acidic oxidation catalysts, but hydration catalysts and dehydration catalysts may also be used. Oxides of aluminum, silicon, phosphorus, vanadium, molybdenum, and chromium are particularly adapted to use in this invention. It will be understood that materials, other than oxides can be used, since such materials will be oxidized under the operating conditions of the process. Exemplary catalyst materials are alumina, silica, and chromia. Particularly preferred are molybdenum- and phosphorus-containing catalysts. Thus molybdenum trioxide and phosphoric acid are good catalyst materials. It has been found that a phosphomolybdic acid catalyst is particularly adapted to the practice of this process.

Where the catalyst consists of alumina and/or silica, no carrier material is needed. For other catalysts, especially vanadium, molybdenum, chromium, and phosphorus materials, it is preferable to utilize a carrier. A preferred carrier for use with phosphoric acid or phosphomolybdate catalysts is activated carbon. When a carrier is used, the catalyst itself desirably comprises from about 1.5 to about 15% of the total weight of the catalyst and carrier, and loadings on the order of 10% are preferable in many embodiments of this invention. Unless otherwise indicated, all parts, proportions, percentages, and ratios herein are by weight.

The catalyst used in the practice of this process can be either a fixed bed or a fluidized bed catalyst.

The pressure can be varied over fairly wide limits with little or no change in the efficiency of the process. This makes the process especially adaptable for integration into a halogenation process as a treatment for effluent gases from previous stages, since the recovery of the halogen values can be carried out without the need for complicated pressure-regulation devices. The process is desirably carried out at approximately atmospheric pressures. The temperature used in carrying out this invention can vary over a wide range. In a fixed bed operation, at too low a temperature problems may arise when one or more of the components of the gaseous mixture tend to condense. Moreover, the use of too low a temperature can reduce the reaction velocity to unduly low levels. On the other hand, greatly elevated temperatures make the process difficult to control and also cause complications in equipment design and handling. Accordingly, it is desirable that the temperatures at which the reaction is carried out be in the range of from about 300 to about 600° C. Good results have been obtained in the preferred range of 430°–590° C.

The contact time of the gaseous stream with the catalyst must be sufficient to ensure efficient operation. It has been found that efficient operation can be obtained at space velocities in the range of from about 200 to about 1000. As used herein, "space velocity" means the volume per hour of gaseous mixture which is fed to a given volume of catalyst. It is conveniently expressed in terms of liters/liters/hour, although any units of volumetric measurement can be utilized so long as the same unit is used to express both volumes.

The process of this invention is especially adaptable to the treatment of mixtures of chlorinated hydrocarbons obtained from the catalytic chlorination or oxychlorination of hydrocarbons, such as methane, ethane, and ethylene, to produce vinyl chloride, monochloroethane, dichloroethane, and the like. After these desired materials are recovered from the reaction stream, the remaining or waste halogenated hydrocarbons can be treated by the process of this invention to recover the halogen values.

The hydrogen chloride is readily recovered from the effluent gas stream by methods well-known in the art. One of the simplest and most straightforward methods is to pass the stream through a scrubber to absorb all of the HCl. If desired, a series of scrubbers can be used. Further, prior to any scrubbing of the effluent gases they can be cooled to a temperature below which water will condense and more or less of the hydrogen chloride will be obtained in the condensed water as hydrochloric acid, depending upon the quantity of water used in the feed.

The following examples illustrate preferred embodiments of the invention as it is now preferred to practice it. It will be understood that the scope of the invention is as defined in the appended claims.

EXAMPLE I

The chlorinated hydrocarbons and water are individually metered as liquids and swept into the top of a preheating and mixing tube by a stream of air. The preheater consists of a 14-inch high, 1-inch diameter Pyrex tube packed with Pyrex beads and heated in an electric furnace. The effluent from the preheater-mixer is fed into the bottom of a 29-inch high, 1¼-inch diameter Pyrex tube inserted into a 2300-watt electric furnace and having a heated length of 23 inches.

Inlet gases from the preheater are passed over glass beads upwardly into the catalyst bed to ensure good flow distribution, and the effluent product stream is conducted into a condensing system comprising two water-cooled condensers. Following the second of the two condensers, two water scrubbers are alternately used to absorb the hydrogen chloride which passes through the condensers. The system then communicates with a wet test meter for measuring the volume of exhaust gases and is also provided with suitable fittings so that gas samples can be withdrawn for analysis, e.g. by gas chromatography for CO and $CO_2$, prior to their passing through the wet test meter, the HCl being determined by titration with standard base of the water scrubber liquid.

The reactor is charged with 300 cc. of a catalyst comprising 15% phosphomolybdic acid deposited on 8–16-mesh activated carbon, and the catalyst is activated by passing air through the reactor for several hours at 550° C. Then a gaseous mixture of 0.7 mole of air, 2.3 moles of steam, and 1.32 moles of chlorinated hydrocarbons is fed into the reactor tube. The chlorinated hydrocarbons are an equimolar mixture of $CH_2Cl_2$, $CHCl_3$, $CCl_4$, $CH_2ClCHCl_2$, $CHCl=CCl_2$, and $CCl_2=CCl_2$.

The catalyst bed is maintained at temperatures of 420–600° C. and the gases are passed through at a space velocity of 960 liters/liters/hour for a contact time of 3.6 seconds. There is 3.4 volume percent oxygen in the feed.

The product stream contains about 4.2 moles of hydrogen chloride, about 0.5 mole carbon monoxide, and about 1.0 mole of carbon dioxide. No chlorinated hydrocarbons are recovered, and the efficiency of conversion of the chlorine values to hydrogen chloride is 100%.

EXAMPLE II

The procedure of Example I is repeated using 6.3 moles of air, 11.5 moles of water and 4.32 moles of the chlorinated hydrocarbon mixture. The temperature is maintained at 430–600° C. with a space velocity of 580 liters/liters/hour, a contact time of 6.1 seconds, and 5.7 volume percent oxygen in the feed.

The product stream contains 13.60 moles of hydrogen chloride, 1.8 moles of carbon monoxide, and 3.6 moles of carbon dioxide. The conversion efficiency of the chlorinated materials to hydrogen chloride is essentially 100%, only 0.2% unreacted halogenated hydrocarbons being recovered.

EXAMPLE III

The procedure of Example I is repeated with a catalyst of 7% phosphoric acid on 8–12 mesh activated coconut charcoal. The feed stream contains 0.5 mole of air, 5.6 moles of water, and 1.92 moles of the same halogenated hydrocarbon mixture utilized in Example I.

The feed mixture is passed through the catalyst bed at a temperature of 400–580° C., a space velocity of 600 liters/liters/hour, a contact time of 6.0 seconds, and with 1.0 volume percent oxygen in the feed.

The effluent stream contains 6.11 moles hydrogen chloride, 1.1 moles carbon monoxide, and 0.8 mole carbon dioxide. About 2% of halogenated hydrocarbons is recovered, and the conversion efficiency of halogenated hydrocarbons to hydrogen chloride is 98%.

Catalysts such as 3/16-inch pellets composed of 74% silica and 17% alumina, ⅛-inch chromia-alumina tablets, ⅛-inch tablets of 10% molybdenum trioxide on alumina, ⅛-inch tablets of 10% vanadium pentoxide on alumina, and 10% phosphoric acid on 6–14-mesh activated carbon also give good conversions of the halogenated hydrocarbons to hydrogen chloride according to the procedure of the foregoing example.

EXAMPLE IV

The apparatus described in Example I is packed with a catalyst containing ⅛-inch tablets of 9% phosphomolybdic acid on alumina. A feed stream of 0.4 mole of air, 1.7 moles of water and 0.99 mole of a mixture of halogenated hydrocarbons is passed through the catalyst bed and the reactor. The halogenated hydrocarbon feed is an equimolar mixture of $CH_2Cl_2$, $CHI_3$, and $CCl_4$. The catalyst bed is maintained in the range of 400–585° C. at a space velocity of 477 liters/liters/hour, a 7.5 second contact time, and with 2.5 volume percent oxygen in the feed.

The effluent gas stream contains 3.0 moles of hydrogen chloride and 2% of the halogenated hydrocarbons are recovered. The conversion efficiency of halogenated hydrocarbons to hydrogen chloride is 98%.

The HCl values obtained in the process of this invention can be recycled to the operation or operations from which the treated halogenated materials came, or they can be used for other hydrohalogenation or oxychlorination reactions.

I claim:

1. A process for recovering the HCl values in chlorinated hydrocarbons which comprises passing a gaseous mixture of chlorinated hydrocarbons, water, and oxygen through a bed of an acid-type catalyst at a temperature in the range of from about 300° to about 600° C. to form hydrogen chloride and recovering the hydrogen chloride so formed.

2. The process of claim 1 wherein the gaseous mixture is passed over the catalyst at a temperature in the range of from about 430° to about 590° C.

3. The process of claim 1 wherein the chlorinated hydrocarbons are chlorinated lower alkyl hydrocarbons.

4. The process of claim 1 wherein the chlorinated hydrocarbons are selected from the group consisting of 1- and 2-carbon atom hydrocarbons.

5. The process of claim 1 wherein the gaseous mixture contains from about 1 to about 10% oxygen by volume.

6. The process of claim 1 wherein the catalyst is an oxide of an element selected from the group consisting of aluminum, silicon, phosphorus, molybdenum, vanadium, and chromium.

7. The process of claim 1 wherein the catalyst is an acidic material selected from the group consisting of phosphoric acid and phosphomolybdic acid.

8. The process of claim 7 wherein the catalyst is deposited on a carrier.

9. The process of claim 8 wherein the carrier is activated carbon.

References Cited

UNITED STATES PATENTS

| | | | |
|---|---|---|---|
| 2,196,246 | 4/1940 | Brown et al. | 23—154 |
| 2,288,865 | 7/1942 | Baehr et al. | 23—154 XR |
| 2,408,950 | 10/1946 | Pines et al. | 23—154 XR |
| 2,705,732 | 4/1955 | Braconier et al. | 23—154 XR |
| 3,006,732 | 10/1961 | Baumgartner et al | 23—219 |
| 3,140,155 | 7/1964 | Cull et al. | 23—155 XR |
| 3,220,798 | 11/1965 | Cull et al. | 23—155 |

EDWARD STERN, Primary Examiner.

U.S. Cl. XR

23—150, 204